INVENTOR
SVERRE GEORGE SEM-SANDBERG
BY Hane and Nydick
ATTORNEYS

May 26, 1964 S. G. SEM-SANDBERG 3,134,971

ANALOG-TO-DIGITAL CONVERTER

Filed Nov. 21, 1960 2 Sheets-Sheet 2

INVENTOR
SVERRE GEORGE SEM-SANDBERG

BY Hane and Nydick
ATTORNEYS

United States Patent Office 3,134,971
Patented May 26, 1964

3,134,971

ANALOG-TO-DIGITAL CONVERTER

Sverre George Sem-Sandberg, Vendelso, Sweden, assignor to Telefonaktiebolaget L M Ericsson, Stockholm, Sweden, a corporation of Sweden Filed Nov. 21, 1960, Ser. No. 70,571
Claims priority, application Sweden Nov. 26, 1959
3 Claims. (Cl. 340—347)

Figure 1A:
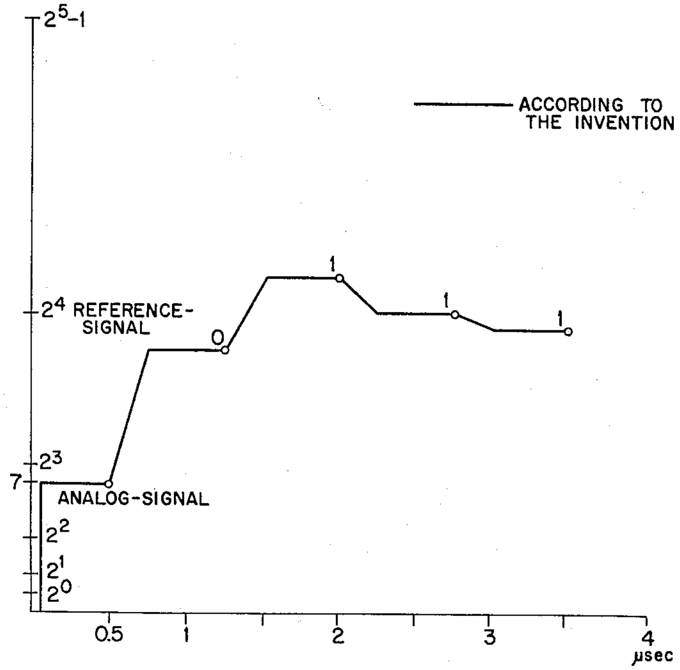

The present invention refers to analog-digital converters; in particular to a new principle permitting analog-digital converters to operate at high speed, more accurately and with greater reliability than before, at the same time the assembly of the arrangement will be more simple and less expensive.

Analog-digital converter types can be divided into two main groups (see A. K. Susskind: Notes on Analog-Digital Conversion Techniques, 1957). The first, the comparison-type, compares the incoming analog voltage or analog signal with voltages or signals which are obtained by the addition of discrete comparison-values $2^{n-1}$, $2^{n-2}$ . . . $2^{n-n}$ (where "full-scale" deviation or capability of the system is $2^n—1$) so that the value of the analog voltage relative to full deviation or full-scale value can be expressed by means of an *n*-digit binary number. Either a "1" or a "0" appears in the different digit positions depending upon whether the analog voltage is greater or less than the value with which the comparison is performed. The comparison begins with for instance the greatest comparison value $2^{n-1}$. If the analog voltage is greater than this value, a "1" appears in the position corresponding to the highest digit weight of the binary number and the next comparison value $2^{n-2}$ is added to the value $2^{n-1}$. If the analog voltage is greater than said sum, a "1" appears in the position corresponding to the next most significant weight ($2^{n-2}$) and the next comparison value $2^{n-3}$ is added to the value of $2^{n-2}$. If, however, the analog voltage is less than said sum a "0" appears instead and the comparison value, the addition of which has resulted in a "0," is subtracted again. The next comparison value $2^{n-3}$ is then added directly to $2^{n-1}$, and the comparison continues until the lowest comparison value corresponding to the lowest digit weight has been added.

The other group of converters called the "cascade-type," consists of a number of stages corresponding to the number of digit positions or digit values. Each stage includes a comparison circuit and a subtraction circuit. The comparison circuit in the first stage compares the analog voltage with the value $2^{n-1}$ (where "full-scale" deviation of the system is $2^n—1$) where *n* designates the number of digit positions in the binary number needed to express the magnitude of the largest analog value that can be accommodated by the converter. If the analog voltage is greater than said comparison value, a "1" appears at the output of the comparison circuit. If, however, the analog voltage is less than the comparison voltage, a "0" appears at the output, instead. In the first case the analog voltage is decreased by said comparison voltage, and said difference is fed to the next stage which compares it in turn with the value $2^{n-2}$. In the abovementioned second case (when a "0" has been obtained) the entire analog voltage is fed to the following stage for comparison with the value $2^{n-2}$. This procedure continues until the last stage has been reached. It is also usual, in converters of said type, to use the same comparison voltage $2^{n-1}$ in each stage and to double the voltage obtained at the output of the preceding stage in order to allow the use of the same reference source.

Both types of analog-digital converters have drawbacks. The comparison type has a limited operating speed by virtue of the fact that should the first comparison result in a "0," the comparison process must be repeated in order to arrive at the right value each time by removing an already present value and replacing it with the next value in the series.

The cascade type causes difficulties due to the fact that decreasing values of reference levels are used. If, however, the same reference level is used it implies that the amplitude to be compared has to be doubled by means of an amplifier between each stage. Any disturbances will be amplified $2^{n-1}$ times from the input to the last stage.

It is a broad object of the invention to provide a novel and improved arrangement which, when applied to delays the appearance of the values until the correct result is determined and which, when applied to converters of the cascade type, permits the use of the same reference level in each stage without the need for amplification between stages.

Figure 1B:
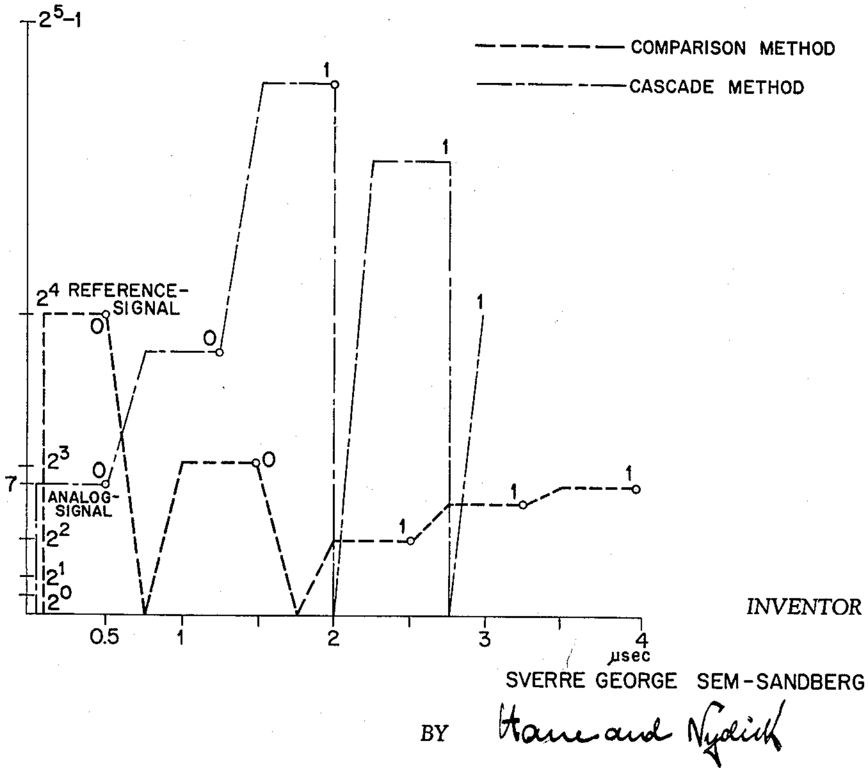
Figure 2:
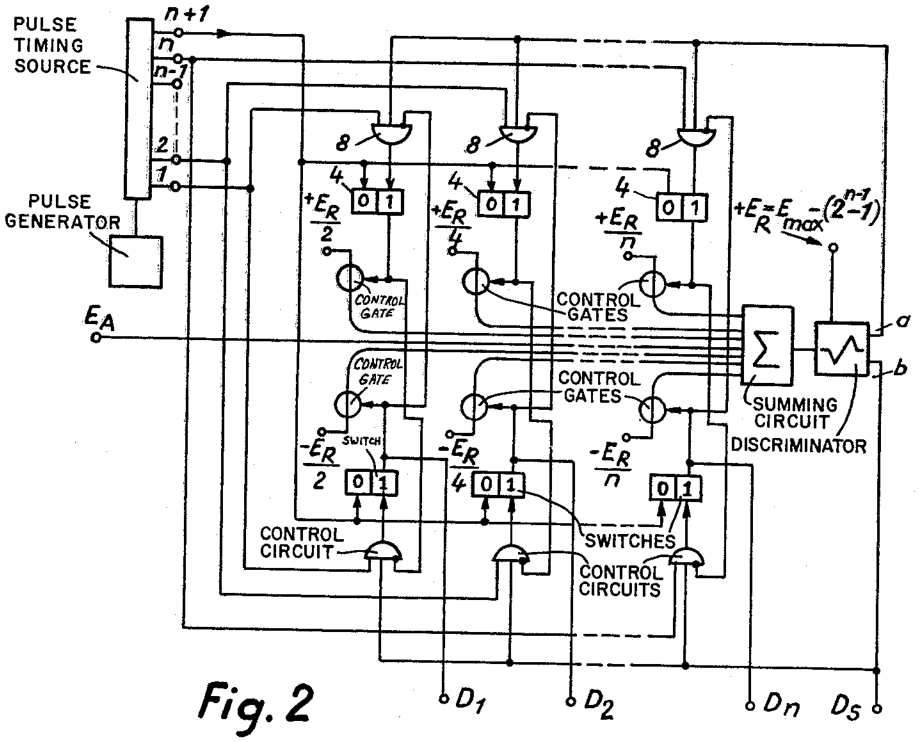
Figure 3:
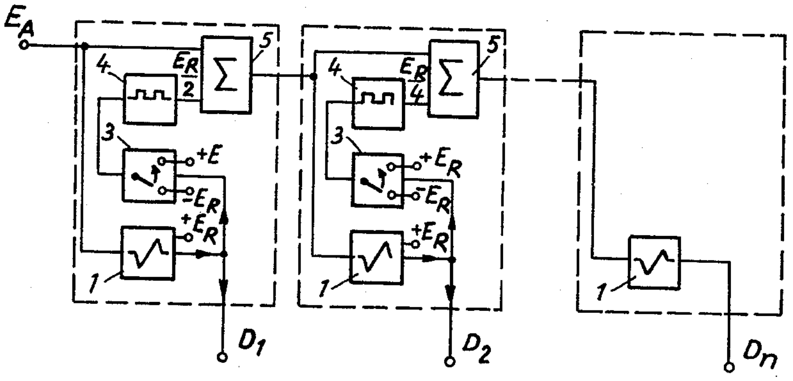

The invention will be described more in detail by means of some embodiments, with reference to the enclosed drawings. FIGS. 1*a* and 1*b* respectively show the differences in operating speed of a device of the comparison-type, a device of the cascade-type and a device according to the present invention. Fig. 2 shows the principle of the invention applied to a device working according to the comparison-principle. FIG. 3 shows the principle of the invention applied to a device working according to the cascade-principle.

FIGS. 1*a* and 1*b* show diagrammatically the timing sequence of a system which has a maximum deviation of $2^5—1=31$ and in which the value of an analog signal is expressed as a 5-digit binary number. According to the example the analog value is taken to be seven. In a comparison-type converter (dashed line, FIG. 1*a*) the value is first compared with a reference value $2^{5-1}=16$. Since 7 is less than 16 a "0" will appear at the output of the $2^{5-1}=16$ position and the comparison value 16 will be replaced by the value $2^{5-2}=8$. It is assumed in the example that the time needed for this comparison is 0.5 $\mu$sec. while the time needed for addition and subtraction is 0.25 $\mu$sec. 1 $\mu$sec. is needed, then, to determine the first digit. Since 7 is less than 8, a "0" appears and the decision is made that reference value 8 is to be subtracted from the comparison value and replaced by reference value 4. The next comparison gives an output "1," which means that addition may be carried out without prior subtraction. The comparison continues until the lowest reference value $2^0=1$ has been added which causes a "1" to appear if the analog value is greater than or equal to the comparison value, and a "0," to appear, if the analog value is less. As shown in FIG. 1 the time needed for determining each digit in a 5-digit binary number is the sum of the time needed for carrying out a comparison, making a decision and for adding or subtracting a reference value. If the analog value is relatively small in comparison with the full deviation, both addition and subtraction must be carried out in a large number of stages, which prolongs the comparison process by a corresponding amount.

If the comparison is made using a circuit as described by the present invention (continuous line FIG. 1*a*), the analog value is at first compared with the value 16 as in a normal converter. Since the comparison shows that the analog value is less than 16, a "0" appears and the reference value $2^{5-2}$ is added to the analog value with a plus sign making the total $7+8=15$. By using the times previously assumed it can be seen that this comparison takes 0.5 $\mu$sec. and the addition, 0.25 $\mu$sec., after which a new comparison follows. The time will consequently be independent of whether the result has been a "1" or a "0." Since a second comparison shows that the modified analog value 15 is still less than 16 a new reference value $2^{5-3}=4$ is added with plus-sign to the first modified value 15 producing a second modified value 19. In the third stage, the value $2^{5-4}=2$ is added with a negative sign since the second modified value was greater than 16 and a third modified analog value 17 results. Finally in the last stage the value $2^{5-5}=1$ is added, also with a negative sign, producing the final modified value 16 which corresponds to the original reference level. If the modified value is less than the reference value a "0" appears. If it is greater than or equal to the reference value a "1" appears. Thus, if the result contains a number of "0" values, the time will be shorter than in the ordinary comparison method since the device has already made its decision when it adds or subtracts the value in question.

FIGURE 1*b* also shows the timing sequence of a cascade-converter (dash-dotted line), which compares the analog value with the reference value 16 in the first stage. If the comparison shows that the analog value was less than the reference value, as, for example, in stage 1, where a "0" appears, the analog value is doubled and fed to the next stage for comparison. If the analog value is greater than the reference value, the difference will be doubled and compared in the next stage with the reference value 16 as in the fourth stage of the example, where the difference $28-16=12$ from the third stage is doubled to 24 and compared with the value 16.

At first glance it appears that the total time involved in making the analog-digital conversion is very nearly the same for both the cascade type converter and the converter described in the invention. However, the invention allows for more construction simplification and greater accuracy than the ordinary cascade type converter as will be discussed later.

FIG. 2 shows an analog converter of the comparison-type to which the principle of the invention has been applied. The device consists of a summing circuit which receives the analog voltage $E_A$, that is to be expressed as a binary number, and the discrete voltage levels with their positive or negative signs attached, which are to be used in the comparison. Summing circuits as herein referred to are known from Susskind, "Notes on Analog-Digital Conversion Techniques," M.I.T. and John Wiley & Sons, New York, Figs. 5–20, pages 4–33. The output of the summing circuit is the sum of the signals fed to the input. In other words, it is the value of the analog voltage modified by the reference voltage levels. This type of summing circuit is well known. The discrete reference voltage levels are ½, ¼ . . . and $1/n$ times the reference voltage $E_R$ with plus and minus signs. The reference voltage can be expressed as $$E_R=E_{max}-(2^{n-1}-1)$$

where $E_{max}$ designates the maximum deviation of the system. Using the values applied in FIG. 1 $E_{max}=31$, then $E_R=16$ and the reference voltage levels will be $\pm 8$, $\pm 4$, $\pm 2$ and $\pm 1$.

The voltage obtained from the output of the summing circuit is fed to a discriminator which compares it with the reference voltage, $E_R$. Such discriminator is known from the same book, Figs. 5 and 6, pages 5–9, and also from F. H. Blacker, "Transistor Circuits for Analog and Digital Systems," Bell System Technical Journal, volume 35, No. 2, pages 295–332, March 1956. Depending on whether it is larger or smaller than the reference voltage, a signal appears in one of two alternative paths *a* or *b*. Any discriminator can be used provided it has the capability of sending the output signal to either of two alternative paths depending on the result of the comparison in the summing circuit. It is also possible for the discriminator to have only one output at which appears both "0's" and "1's" depending on the result of the comparison in the summing circuit. If such a discriminator is used both paths *a* and *b* are connected to this same output. One of the paths contains an inverter (a logic circuit which changes a "1" to a "0" and a "0" to a "1"). It can be readily seen that the signals appearing in each path will be exactly the same as would appear had the discriminator two outputs instead of one.

The arrangement comprises *n*-stages corresponding to the number of binary digits in the final result. At the input of each stage are two bistable switches which are either in a current conducting (logical "1") state or a non-conducting (logical "0") stage depending on which of the two inputs receives a signal. Each of the switches is associated with a logic or control circuit which is defined as an "inhibited AND gate." Its conductive output state (logical "1") is dependent on the condition that two particular inputs (and only these two) receive a signal. A logical output "0" will result if either of these two signals are missing or if the third input signal is present. When the control circuit is conducting the switch receives a signal which brings it into conduction (logical "1"). Reset signals which return the switch to its "0" state are received periodically from a pulse source which will be described below. To each of the switches is connected a control gate which closes a current path when the switch is in its "1" state and opens the current path when the switch is in its "0" state. These two gates in each stage control the sign of the reference voltage (either a plus reference or a minus reference) that is to be used in the summing circuit.

The system also includes a pulse timing source which may be but does not have to be a delay-line having $n+1$ outputs as shown in this example. A pulse appears at an output of the delay line corresponding to the number of the respective stage it is to drive; each output receiving a pulse in turn. A pulse generator feeds the delay-line each time a sampling is to be made. The pulse generator and the delay-line are based on well known principles, and they do not constitute part of the present invention.

The analog signal $E_A$ which is fed to the summing circuit and from there to the discriminator is a constant value since at the moment of the sampling all the gates are open and no additional voltage can be received. If the analog voltage is greater than the value $E_R$, a signal is received in bath *b*, but no signal is received in path *a*. If, however, this analog voltage is less than the value $E_R$, a signal is received in path *a* but none is received in path *b*. In the first-mentioned case a signal will be received at one of the inputs to the lower logic or control circuits in every stage, while the logic or control circuits in the upper row will not be operated. In order to render the logic or control circuits in the lower row current conducting it is also necessary to satisfy the other condition, that is, the other input must receive a signal. As can be seen in FIG. 2, the outputs of the delay-line are connected in each stage to the logic or control circuit in the upper as well as lower row. If the delay-line has just received a starting pulse from the pulse generator, a signal is received at output 1 which is connected to both logic or control circuits in the first stage. Owing to the fact that one of the inputs of the lower circuit has already been chosen to indicate that the analog voltage is greater than the reference voltage, the conditions for the functioning of the circuit are satisfied and the circuit will become current conducting. In so doing, the corresponding switch in the stage is set to give a "1" output which in turn closes control gate. As a result a digit "1" will be indicated at output $D_1$. As explained before, the reference voltages are added to the analog voltage with a minus-sign, if the comparison has shown that the analog voltage is greater than the reference voltage, and with a plus-sign, if the comparison has shown that it is smaller. It can be seen from FIG. 2 that the gating of a reference voltage with a plus-sign is done by the upper gate, while the gating of the same reference voltage with a minus-sign is done by the lower gate in each stage. Thus, if the lower switch in the first stage has been brought to a "1" stage, the reference voltage $$\frac{E_R}{2}$$

in the first stage is fed with a minus-sign to the summing circuit, together with the analog voltage, so that their sum may now be compared with the reference voltage in the discriminator. If this sum is less than the discriminator's reference voltage, a signal is received in path *a* from the discriminator and the conditions for activating the upper row of switches will have been satisfied. Consequently, when output 2 of the delay-line sends a signal to the second stage, only the upper switch can be triggered to a "1" state. This means that the reference voltage $$\frac{E_R}{4}$$

of the second stage will be fed with a plus-sign to the summing circuit together with the first two voltages and the comparison continued in the same manner as in the other stages.

The logic circuits also include a blocking function. This can readily be seen by noting that when one of the lower switches is in a "1" state it provides an inhibit condition for one of the logic or control circuits controlling the upper switches and vice versa. This blocking function is necessary in order to prevent the signal from the discriminator intended for the next stage from operating the non-conducting switch if the signal from the delay line is still present in the preceding stage. Path *b* is connected to output $D_s$ allowing a direct sequential read-out without necessitating any additional circuitry. This can be seen by realizing that path *b* will give a "1" output as long as the input voltage of the discriminator is larger than $E_R$, and will give a "0" output if it is smaller. Such a function is suitable for transmitting digital information over a single conductor path. This is an advantage not found in previously known systems.

Indication of the result is performed by means of the lower switches. Their "0"-state and "1"-stage correspond to the digits "0" or "1" respectively in the respective digit positions of the resultant binary number. Signals received at outputs $D_1, D_2 \ldots D_n$ can be sent to ordinary types of data recording devices.

FIG. 3 shows the principle of the invention applied to a converter of the cascade-type. In order to express the analog value as an *n*-digit binary number, the converter has *n*-stages, each of which includes an ordinary discriminator 1. A signal will appear at the output of the discriminator if the analog voltage $E_A$ or its value modified with the reference voltages is greater than a predetermined reference voltage $E_R$ which is given by:

$$E_R = E_{max} - (2^{n-1} - 1)$$

as in the example of FIG. 2, where $E_{max}$ is the maximum deviation of the system. If the analog voltage is less than this reference level, no indication is received at the output of the discriminator. This output, which is connected to switching circuit 3, produces a voltage equal to $+E_R$, if the output of the discriminator is a "0," and a voltage equal to $-E_R$, if the output of the discriminator is a "1." The voltage received from the switching circuit is fed to an attenuator 4. The attenuation is set for each stage so that the attenuation factor is ½ in the first stage, ¼ in the second stage, etc. The reference voltage received from the attenuator, which in the first stage is plus or minus $$\frac{E_R}{2}$$

is fed to a summing circuit 5 together with the analog voltage $E_A$. The output of the summing circuit is fed to the next stage which corresponds to the next most significant digit in the binary number. This stage is nearly identical to the preceding stage, the only difference being the attenuation factor ¼ of the atteuator. The *n*th stage differs from the preceding stages in the associated discriminator circuitry. The function of this stage is only to indicate whether the modified analog voltage received from the preceding stage is larger than or smaller than the reference value $E_R$. The output of this stage will correspond to the least significant position of the binary number.

The analog voltage to be converted is fed, in the first stage of the converter, to both the summing circuit 5 and the discriminator 1. The discriminator decides whether the amplitude is greater than the reference voltage $E_R$, and will give an output "1" if it is and "0" if it isn't. At the same time this same output appears at $D_1$ which is connected to a recording device. Depending on whether the output of the discriminator is a "1" or a "0," the reference voltage $E_R$ will be either plus or minus, respectively, and will appear at the output of the switching circuit 3. The attenuator 4 divides this voltage by two and feeds the reduced voltage to the input of the summing circuit 5. Since the analog voltage also appears at the input to this summing circuit, the output of this circuit will be the analog voltage modified by the reference voltage $$\frac{E_R}{2}$$

This value is then fed to both the discriminator and the summing circuit in the next stage, where the process is repeated. The only difference will be that the reference voltage will be plus or minus $$\frac{E_R}{4}$$

The input to the last stage will include only a discriminator as there is no need for a summing circuit.

As it is clear from the aforesaid the invention affords considerable advantages over present day converters. It is not necessary to wait with the recording of each binary digit until its value has been tested as in usual comparison-converters. There will be no time lost in a possible subtraction of a comparison value, if the analog value is smaller than the sum of the comparison values. Therefore the operating time will be less than of equal to the operating times of present day converters regardless of whether the analog value is larger than or smaller than the comparison value. This is a decided advantage in high-speed converters for communication systems.

With regard to cascade-converters the present invention provides a considerable advantage in eliminating the amplification between the stages. In present day cascade-type converters an error at the input is amplified $2^{n-1}$ times which greatly reduces the reliability of the converter. Such disadvantages may be overcome by eliminating the amplification between stages but only at the expense of circuit simplicity, reliability and cost. By using the principle of the invention in a cascade-converter, amplification can be eliminated. Only a reference voltage and a summing circuit between stages will be needed. In this manner the reliability of a cascade-type converter will increase while the cost will decrease.

To explain the invention further, an example is given, in FIGS. 2 and 3, of the way in which a digital signal is derived when an arbitrary analog input is received.

When an analog signal $E_A$ of value seven, for example, is fed to the summing circuit 1, and from there to the discriminator 3, a comparison in the latter is carried out using the reference value $E_R = 16$. Since this reference value is greater than the analog value, a signal is received at output *a*, so that the circuits in the upper part of the figure become activated. Since two input signals are necessary for the activation of a circuit and only the first stage can receive another signal from the output of the delay line 7, only the first stage will operate. This implies activation of the flip-flop 4 which thus supplies the reference voltage $$\frac{+E_R}{2}=8$$

The summing circuit now receives both the reference voltage and the analog voltage and produces a net voltage of 7+8=15. In the discriminator, this net value is compared with the reference value 16, and consequently output *a* is again activated since the reference value is still greater than the signal. As can be seen in the figure, the output $D_1$ from the first stage has received no signal. This means that the first digit will be a "0." The signal in *a* and the signal from output 2 of the delay-line 7 activate the logic circuit in the second stage in the upper part of the figure so, as in the previous case, that a voltage $$\frac{+E_R}{4}=4$$

is added to the analog voltage and the previous reference voltage; the so-called modified voltage. The output $D_2$ has not been activated in this case either so the second digit will also be zero. Now the sum 7+8+4=19 is supplied to the summing circuit 1 and is compared in the discriminator with the reference voltage 16. Since this sum is now greater than the reference voltage, output *b* will be activated. The signal at *b* can now activate the third stage in the lower part of the figure (not shown). A new reference voltage, $$\frac{-E_R}{2}=2$$

will be supplied to the summing circuit, together with the analog voltage and previous reference voltages, when a signal is received at the third output (not shown). The value 17 will now be compared with the original reference voltage in the discriminator. Since a signal is received at the third output this means that the third digit of the binary number is a "1." This process continues until the last stage has been activated by a signal from both the delay line and the discriminator simultaneously.

When the analog value $E_A=7$ is supplied to the first stage of the converter shown in FIG. 3, a comparison is carried out in the discriminator 1. As a result of this comparison the reference value $E_R$ is supplied to an attenuator 4 with either a plus or a minus sign. As the comparison in the discriminator shows that 7 is less than the reference voltage 16, the reference voltage is supplied to the attenuator with a plus sign, and the attenuator produces half of the analog voltage value, $$\frac{E_R}{2}=8$$

This value is supplied together with the analog value to the summing circuit 5, and is there added to the analog value obtained directly from the input. From the output of this summing circuit a signal of the value 15 is fed to the second stage. In the second stage, this signal is again compared, in the discriminator 1, with the reference voltage 16. A reference voltage with a plus sign is produced since the input value was less than 16 and the value $E_R$ that is fed to the attenuator is divided by 4. This value, $$\frac{E_R}{4}=4$$

is then fed to the summing circuit together with the input value 15. The output of the summing circuit thus receives a signal of the value of 19 which is fed to the next stage. The same process continues until the comparison has been carried out in the last stage. No signal is received at outputs $D_1$, $D_2$, etc., if the comparison in the discriminator shows that the reference voltage is greater than the input signal. If, however, the reference voltage is less than the input signal, an output signal is received.

This condition corresponds to a "1" in that binary digit position.

I claim:

1. An analog-to-digital converter for expressing an analog signal value as an *n*-digit binary number, said converter comprising means for producing additional signal values $2^{n-2}$, $n^{n-3}$ . . . $2^{n-n}$ having positive and negative sign, respectively, summing circuit means for producing at an output a sum consisting of said analog signal value and said additional values, means for comparing the output voltage obtained from said summing circuit means with a reference value of $2^{n-1}$ and producing two different signals, one signal if said output voltage is greater than said reference voltage and another signal if said voltage output is less than said reference voltage, respectively, a first group of control means operated by said one signal and causing activation of said means for producing additional signal values with plus sign, a second group of control means operated by said other signal and causing activation of said means for producing additional signal values with minus sign, and output means producing, depending upon said one and said other signal, respectively, two alternative output signals representing 1 and 0 respectively, said output signals corresponding to a digit position in said *n*-digit binary number, and time control means allowing subsequent activation of individual control means in said first and said second group of control means, respectively, for supplying additional signals subsequently to the summing circuit means.

2. A digital-analog conversion system for expressing an analog voltage value as an *n*-digit binary number, said system comprising summing means for producing voltage values consisting of the sum of said analog voltage and additional voltages expressed as $2^{n-2}$, $2^{n-3}$ . . . $2^{n-n}$, means for subtracting by successive steps said analog voltage and said sums respectively from a reference value $2^{n-1}$, means for rendering said additional voltages negative in response to said summing operation if the result of the subtraction is negative in the preceding step, output means for producing, depending upon the negative and positive sign respectively of the result of said subtraction, two alternative output signals representing 1 and 0 respectively, said outputs each corresponding to a digit position in said *n*-digit binary number, separate stages each corresponding to a digit position in said *n*-digit binary number and each including two sub-circuits one for producing said additional voltage with plus-sign and the other for producing said additional voltage with minus-sign, means for activating said stages in turn so as to produce said additional voltages, a summing circuit having an input fed by said analog voltage and by said additional voltages in successive steps, and a discriminator for comparing the signal obtained from said summing circuit with said reference signal value, said discriminator producing, dependent upon the comparison result, a signal activating the sub-circuit in the respective stage which produces said additional voltage with minus-sign if the comparison result is negative and producing another signal activating the sub-circuit in the respective stage which produces said additional voltage with plus-sign if the comparison result is positive, each stage having an output indicating by its activated condition the value 1 and indicating by its unactivated condition the value 0, said output being activated by activation of the negative additional voltage-producing sub-circuit in each stage.

3. A system according to claim 2, wherein said separate stages each correspond to a digit position in said *n*-digit binary number, at least *n*—1 stages including each a discriminator for comparing with the reference voltage the voltage supplied to the input of the stage and for producing a first signal if the input voltage is higher than the reference voltage and a second signal if the input voltage is lower than the reference voltage respectively, means for producing said reference voltage with plus-sign and minus-sign respectively depending on said first and said second signal respectively, means for producing from said reference voltage having a plus-sign or a minus-sign one of said additional voltages by voltage division, a summing circuit in said at least $n-1$ stages for adding said additional voltage to a voltage applied to the input of the stage and for supplying the resulting voltage to the input of the next stage, and an output in each stage activated by said second signal only, the activated condition of said output representing the value 1 and unactivated condition representing the value 0 in said $n$-digit binary number.

References Cited in the file of this patent

UNITED STATES PATENTS

| | | |
|---|---|---|
| 2,970,309 | Towles | Jan. 31, 1961 |
| 3,046,543 | Kaenel | July 24, 1962 |